United States Patent [19]

Ohern

[11] Patent Number: 4,850,165
[45] Date of Patent: Jul. 25, 1989

[54] HEAT RESISTANCE BRICK

[76] Inventor: Iyn-Yeong Ohern, No. 5, South Lane 1, Chen Hi Rd., Chien Chen District, Kaohsiung, Taiwan

[21] Appl. No.: 277,453

[22] Filed: Nov. 15, 1988

Related U.S. Application Data

[63] Continuation-in-part of Ser. No. 254,743, Oct. 7, 1988, abandoned.

[51] Int. Cl.⁴ .............................................. E04B 07/00
[52] U.S. Cl. ........................................ 52/199; 52/302; 52/309.9
[58] Field of Search .................... 52/302, 303, 309.4, 52/309.9, 309.11, 199, 811

[56] References Cited

U.S. PATENT DOCUMENTS

| | | | |
|---|---|---|---|
| 572,762 | 12/1896 | Landers | 52/303 X |
| 1,319,113 | 10/1919 | Reagan | 52/606 X |
| 1,907,170 | 5/1933 | Hearn | 52/606 X |
| 3,387,420 | 6/1968 | Long | 52/302 |
| 4,630,421 | 12/1986 | Diehl et al. | 52/309.4 X |

FOREIGN PATENT DOCUMENTS

| | | | |
|---|---|---|---|
| 2216713 | 10/1973 | Fed. Rep. of Germany | 52/811 |
| 2512648 | 9/1976 | Fed. Rep. of Germany | 52/309.9 |

Primary Examiner—David A. Scherbel
Assistant Examiner—Lan Mai
Attorney, Agent, or Firm—Varndell Legal Group

[57] ABSTRACT

The invention relates to an improved heat resistance brick, which comprises an upper board and a lower board, said upper board being made of solid polylone, said lower board being made of the mixture of wooden chips and urea by means of press molding process, said upper and lower boards being arranged to provide water outlets, and said lower board being arranged to provide well-shaped drainage canals at the bottom so as to match with said water outlets for water drainage. By means of the color change on the upper board, the bricks are arranged on the roof to provide preferred patterns to make the roof more attractive. By means of the utilization of waste material to produce lower board to reduce the manufacturing cost. By means of said arrangement to provide good heat resistance bricks for practical use.

1 Claim, 2 Drawing Sheets

HEAT RESISTANCE BRICK

This application is a continuation-in-part of application Ser. No. 07/254,743 filed 10/7/88 now abandoned.

BACKGROUND AND SUMMARY OF THE INVENTION

During hot summer season, direct sunlight may radiate over the roof to incubate the houses. Therefore, there must be some heat isolating or resistance arrangement on the roof. Somebodies may build up a frame structure on the roof and arrange corrugated plate on the top of the frame structure to keep direct sunlight away from the roof. However, the build up frame structure on the roof may violate the provisions of the building code. Therefore, some other people may pave the roof with heat resistance bricks directly to isolate the heat. However, the heat resistance bricks that are commonly used are not very practicable in application, of which the cost is expensive, the installation is difficult. Because the conventional heat resistance bricks are quite heavy, they are not convenient for delivery. During installation, if the size can not fit, the protruding portion is knocked off. Since heat resistance brick is very hard, it is very difficult to knock off the protruding portion, or if the protruding portion is knocked off, the rest of the brick may become irregular in configuration and bad in outer appearance. Further, the heavy weight of the bricks may become a big burden to the roof to serious affect the structure of the whole building. Moreover, the manufacturing process for producing conventional heat resistance bricks is rather complicated, and therefore, the manufacturing cost is very expensive. In view of said reasons, there is a strong demand for improved and inexpensive heat resistance brick to provide good performance in most efficient way.

The present invention is to provide an improved heat resistance brick, which is featuring in that:

(1) The brick, according to the invention, comprises an upper board made of solid polylone, having water outlet for water drainage; a lower board made of wooden chips and urea by means of press molding process, having drainage canal to match with the water outlet of the upper board for water drainage. Therefore, when the upper and the lower boards are stuck together the whole assembly provides less weight, good heat isolating effect, and the water outlet and drainage canal are well arranged to provide good water drainage effect.

(2) Since the upper board is made of solid polylone, it can be arranged to provide assortment of colors. When the bricks are surfaced on the roof, they may be arranged according to preferred pattern, to provide a beautiful appearance.

(3) Because the lower board contains wooden chips which are mixed with thermo setting plastics (urea) for press molding, the manufacturing cost of the present invention is inexpensive and the production process is easy to operate. Therefore, the present invention provides high economical value.

(4) The wooden chips contained in the lower board provide good water absorbing effect. During raining and windy days, the lower board is increased in weight due to water absorption, and therefore, it stabilizes the whole assembly of the brick. Further, during installation of the bricks according to the invention, the bricks are tightly arranged one another to provide high tension, such that at regular time, the bricks will not be blown away even by strong wind force.

(5) The heat resistance brick according to the invention is very light and convenient for delivery. In case the size does not fit, it can be straightly sawed into a preferred size to provide neat appearance.

The above and other objects, features and advantages of the present invention will be fully understood from the following description considered in connection with the accompanying drawings.

BRIEF DESCRIPTIN OF THE DRAWINGS

DETAILED DESCRIPTION OF THE PREFERRED EMBODIMENT

Figure 2:
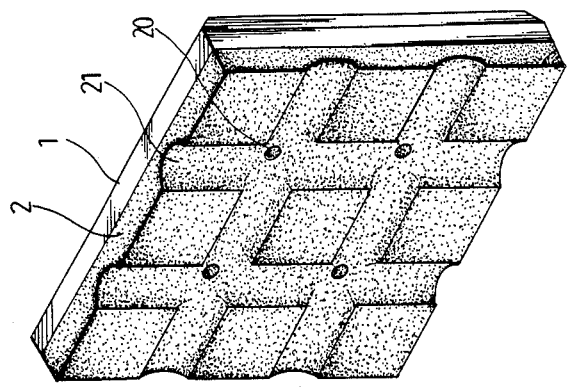
FIG. 2 is a perspective assembly view of the preferred embodiment.
Figure 1:
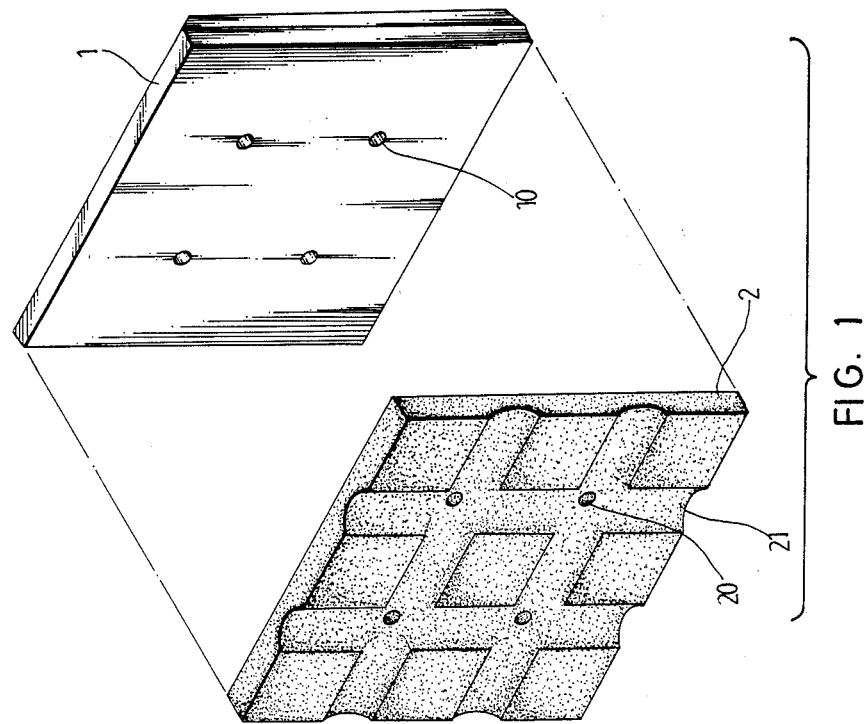
FIG. 1 is a fragmentary perspective view of a heat resistance brick embodying the present invention.
Figure 3:
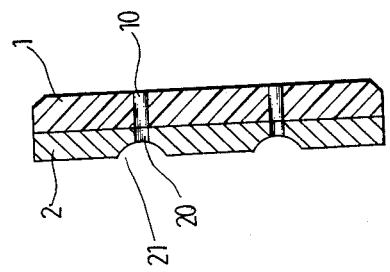
FIG. 3 is a sectional view of the preferred embodiment.

Referring to FIGS. 1, 2 and 3, a heat resistance brick according to the invention, comprises an upper board 1 and a lower board 2. Said upper and lower boards are stuck together by means of adhesive agent. Said upper board 1 is made of solid polylone to provide good weather proof and heat resistance properties. The term "polylone" is used herein to mean any type of foamed plastic material, including thermosetting resins or plastics, such as polyurethane foams. Various additives can be included in the plastics material to improve its properties, such as heat resistance and weatherability. The upper board 1 has four water outlets 10 to match with the water outlets 20 of the lower board 2. The outlets 20 are arranged in the well-shaped drainage canals 21 at the bottom of the lower board 2. Said lower board 2 is made of the mixture of wooden chips and urea (thermosetting plastics), by means of press molding process. Therefore, the manufacturing process for the heat resistance bricks according to the invention is very simple. Because the cost for the upper board 1 and the lower board 2 is very cheap, the invention provides high economical value.

Figure 4:
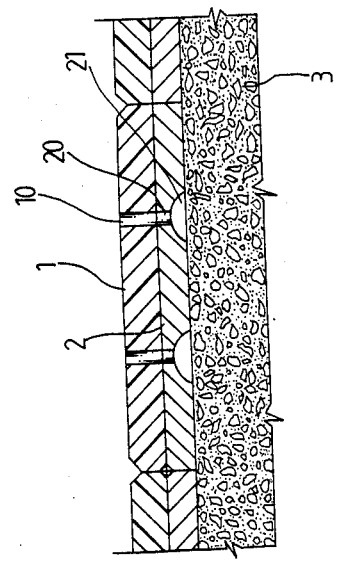
FIG. 4 is a schematic view drawing of the invention, illustrating its application.

Referring to FIG. 4, the heat resistance bricks according to the invention are directly surfaced on the roof 3. Due to light weight, the loading on the roof is minimized, and high security is thus achieved. During raining days, the rain water is draining off through the water outlets 10 of the upper board 1, and the water outlets 20 and drainage canals 21 of the lower board 2. The wooden chips contained in the lower board 2 can absorb the water to increase the weight so as to stabilize the brick and to protect the brick against strong wind force. During installation, the bricks are tightly surfaced on the roof to provide high tension force among the bricks such that the bricks will not be blown away by strong wind force during regular time. While paving, the bricks for the side line may not fit perfectly in size. In order to fit the size, the bricks according to the invention can be sawed into preferred and neat size without damaging the outer appearance. Further, during the production for the upper board 1, it can be arranged to provide assortment of colors. Therefore, the bricks according to the invention can be surfaced on the roof 3 to provide beautiful patterns and to make the roof more attractive.

I claim:

1. An improved heat resistance brick comprising an upper board and a lower board fasten together by means of adhesive agent, said upper board arranged in an assortment of colors for a more attractive appearance being made of solid polylone for providing a good weather proof and heat resistance effect, and having four water outlets communicating with water outlets of the lower board for water drainage; the water outlets of the lower board being arranged with drainage canals for providing a good drainage effect, and said lower board being made of the mixture of wooden chips and urea by means of press molding process.

* * * * *